(12) United States Patent
Ehm

(10) Patent No.: US 8,408,763 B2
(45) Date of Patent: Apr. 2, 2013

(54) PROJECTION HEADLIGHT ARRANGEMENT FOR VEHICLES

(75) Inventor: Matthias Ehm, Lippstadt (DE)

(73) Assignee: Hella KGAA Hueck & Co., Lippstadt (DE)

( * ) Notice: Subject to any disclaimer, the term of this patent is extended or adjusted under 35 U.S.C. 154(b) by 731 days.

(21) Appl. No.: 12/538,853

(22) Filed: Aug. 10, 2009

(65) Prior Publication Data

US 2010/0033978 A1    Feb. 11, 2010

(30) Foreign Application Priority Data

Aug. 11, 2008   (EP) ..................................... 08162131

(51) Int. Cl.
*F21S 8/10* (2006.01)
(52) U.S. Cl. ....................................... 362/464; 362/539
(58) Field of Classification Search .................. 362/464, 362/465, 467, 539, 513, 512
See application file for complete search history.

(56) References Cited

U.S. PATENT DOCUMENTS

| | | | |
|---|---|---|---|
| 3,341,700 A | 9/1967 | Finch | |
| 5,339,226 A * | 8/1994 | Ishikawa | 362/539 |
| 5,645,338 A | 7/1997 | Kobayashi | |
| 6,309,093 B1 * | 10/2001 | Tabata et al. | 362/539 |

FOREIGN PATENT DOCUMENTS

| | | |
|---|---|---|
| DE | 2144197 A1 | 3/1972 |
| DE | 19756574 A1 | 10/1998 |
| DE | 102006043281 A1 | 3/2008 |
| EP | 0900972 A | 3/1999 |
| WO | 2008037388 A2 | 8/2009 |

* cited by examiner

Primary Examiner — Sharon Payne
(74) Attorney, Agent, or Firm — Husch Blackwell LLP; Robert C. Haldiman; H. Frederick Rusche

(57) ABSTRACT

The invention relates to a projection headlight arrangement for vehicles with a left projection headlight and a right projection headlight, each comprising: a reflector exhibiting two focal points, a light source arranged in a first focal point of the reflector, a lens upstream of the reflector in the direction of light emission whose focus is arranged in the proximity of the second focal point and a diaphragm shaft arranged between the lens and the reflector, which is displaceable in several rotary positions by means of a control unit around a horizontal rotary axis running transversely to the optical axis, wherein the rotary positions each have a diaphragm edge of the diaphragm shaft assigned for the creation of a light-dark boundary for a specified light distribution, wherein a sensor unit is provided for the detection of a traffic participant located in the far-field of the vehicle, the control unit distorts the diaphragm shaft in such a way in dependence on a sensor signal of the sensor unit that such a diaphragm edge of the diaphragm shaft is active, that a complete illumination of the far-field takes place, without blinding the traffic participant detected in the far-field of the vehicle and the diaphragm edges are assigned to light function sectors of the diaphragm shaft, said light function sectors sweeping a variable angular region in the direction of rotation of the diaphragm shaft.

12 Claims, 5 Drawing Sheets

PROJECTION HEADLIGHT ARRANGEMENT FOR VEHICLES

CROSS REFERENCE TO RELATED APPLICATIONS

This application claims the benefit of European Patent Application No 08162131.0, filed on Aug. 11, 2008, in the European Patent Office, the disclosure of which is incorporated herein by reference.

DESCRIPTION

The invention relates to a projection headlight arrangement for vehicles with a left projection headlight and a right projection headlight, each comprising: a reflector exhibiting two focal points, a light source arranged in a first focal point of the reflector, a lens upstream of the reflector in the direction of light emission whose focus is arranged in the proximity of the second focal point and a diaphragm shaft arranged between the lens and the reflector, which is displaceable in several rotary positions by means of a control unit around a horizontal rotary axis running transverse to the optical axis, wherein the rotary positions each have a diaphragm edge of the diaphragm shaft assigned for the creation of a light-dark boundary for a specified light distribution.

From EP 0 900 972 A1 a projection headlight arrangement is known consisting of identically designed left and right projection headlights arranged in the corner-side front end region of a vehicle, said projection headlights each having a light source, a reflector, a lens and a diaphragm device arranged between the lens and the reflector. The diaphragm device exhibits a diaphragm shaft which is displaceably arranged around its own longitudinal axis and can be rotated in a plurality of positions. The diaphragm shaft is moved by means of a control unit around the rotary axis, said rotary axis running in horizontal direction and transversely to the optical axis of the projection headlight. The diaphragm shaft exhibits four diaphragm edges which are arranged offset at 90° in rotary direction. By means of distortion of the diaphragm shaft in a working position, in which one of the diaphragm edges is active, a light-dark boundary can be formed for the production of a symmetrical passing light (basic, town or adverse weather light) or of an asymmetrical passing light or a freeway light or a high beam distribution. Unfavorable in the known projection headlight arrangement is the fact that the number of light distributions projected by the diaphragm edges is limited to four standardized light distributions, which in the respective working position mean a fixed light distribution regardless of the current traffic situation.

Therefore it is the object of the present invention to improve a projection headlight arrangement for vehicles in such a way that the greatest possible illumination of a far-field of the vehicle is made possible, without blinding an oncoming traffic participant and/or a traffic participant in front.

For the solution of this problem the invention, in combination with the generic term of claim 1, is characterized in that a sensor unit is provided for the detection of a traffic participant located in the far-field of the vehicle, the control unit distorts the diaphragm shaft in such a way in dependence on a sensor signal of the sensor unit that such a diaphragm edge of the diaphragm shaft is active, that a complete illumination of the far-field takes place, without blinding the traffic participant detected in the far-field of the vehicle and the diaphragm edges are assigned to light function sectors of the diaphragm shaft, said light function sectors sweeping a variable angular region in the direction of rotation of the diaphragm shaft.

The special advantage of the invention arises from the division of an inventive diaphragm shaft into different light function sectors which are self-driven in dependence on the current traffic situation so that the optimum diaphragm edge is dynamically active for the production of the light-dark boundary. A sensor unit determines the current traffic situation, that is determines the location of an oncoming traffic participant and/or of a traffic participant in front, so that the light function sector of the diaphragm shaft is set in dependence on the current position of this additional traffic participant.

According to a preferred embodiment of the invention a first light function sector is constructed as an adaptive light function sector, said light function sector extending in an acute or right angle around the rotary axis of the diaphragm shaft. On the jacket surface of the first light function sector a plurality of diaphragm edges extends in longitudinal direction of the diaphragm shaft, said diaphragm edges having different light distributions assigned to them. These diaphragm edges combined in the first light function sector produce standardized light distributions which each exhibit a static light recess region. The diaphragm edge for the production of the passing light distribution exhibits a 15° gradient, which prevents a blinding of the opposing traffic. The diaphragm edges of the left projection headlight and of the right projection headlight are arranged only offset transversely to the vertical longitudinal center plane of the vehicle. Due to the fact that the diaphragm edges of the first light function sector are arranged at a relatively small angle to each other, a rapid changeover can take place between the light functions of the first light function sector. Preferably diaphragm edges are provided between the standard diaphragm edges producing the standardized light distributions, which produce overpass light distributions so that continuous transitions are created between the standard light distributions.

According to a further development of the invention a second light unction sector of the diaphragm shaft is constructed as a high beam light function sector, which extends over an angular region of 180°. The diaphragm edges of the left and right projection headlights required for this purpose are identical and arranged offset transversely to the vertical longitudinal center plane of the vehicle. The diaphragm edge of the second light function sector exhibits no light recess region, so that there is an automatic switch to the second light function sector as soon as no further traffic participants are detected.

According to a further development of the invention the diaphragm shaft exhibits a third light function sector which serves as a high beam light redirection sector. Said high beam light redirection sector extends in an obtuse or right angular region and is arranged adjacent to the first light function sector and the second light function sector. The diaphragm edges of the left projection headlight and of the right projection headlight running in this light function sector run in mirror-inverted manner to the vertical longitudinal center plane of the vehicle. Advantageously, as a result of this a light recess region can be produced which can be moved for overlapping with an oncoming vehicle and/or a vehicle in front. In the case of corresponding guiding of the diaphragm shaft or of the projection headlight a dynamic adjustment of the light recess region to the current traffic situation can take place.

The division of the diaphragm shaft into different light function sectors makes it possible for an optimum illumination of the vehicle far-field in dependence on the current traffic situation. In dependence on the current traffic situation it is possible for example proceeding from a passing light distribution in accordance with a diaphragm edge in the first light function sector to immediately switch to the second light function sector for the production of a high beam light function or to immediately switch to the third light function sector for the production of a non-glare high beam light.

According to a further development of the invention the diaphragm shaft can be pivoted around a vertical axis perpendicular to the optical axis, so that the light recess region of the diaphragm edge of the third light function sector can be adjusted in dependence on the detected location of the vehicle (traffic participant) in front and/or the oncoming vehicle (traffic participant). A comprehensive illumination of the street area is always guaranteed, wherein a blinding of the vehicle in front or of the oncoming vehicle is prevented. No strong irradiance fluctuations or strong contrasts arise for the vehicle operator, since the light recess region is preferably filled out by the oncoming luminescent vehicle. Preferably the light recess region is dynamically guided to the current position of the oncoming vehicle, until the oncoming vehicle has laterally passed the operator's vehicle. Then the projection headlight arrangement abruptly switches to the high beam light function, in which the entire street area region is lit up over its width. Not until an oncoming vehicle or a vehicle in front is again detected does the diaphragm shaft turn to such a working position that an adjusted light distribution is produced.

Further advantages of the invention arise from the additional dependent claims.

Exemplary embodiments of the invention will be explained more closely in the following with the help of the drawings.

BRIEF DESCRIPTION OF THE DRAWINGS

FIG. 3b shows a schematic representation of a light distribution with a central light recess region in a working position of the diaphragm shaft in accordance with FIG. 3a.

DETAILED DESCRIPTION OF THE INVENTION

An inventive projection headlight arrangement 1 consists essentially of a left projection headlight 2 and a right projection headlight 3, which are each framed in the corner of a body opening arranged on a front end of a vehicle.

Figure 7:
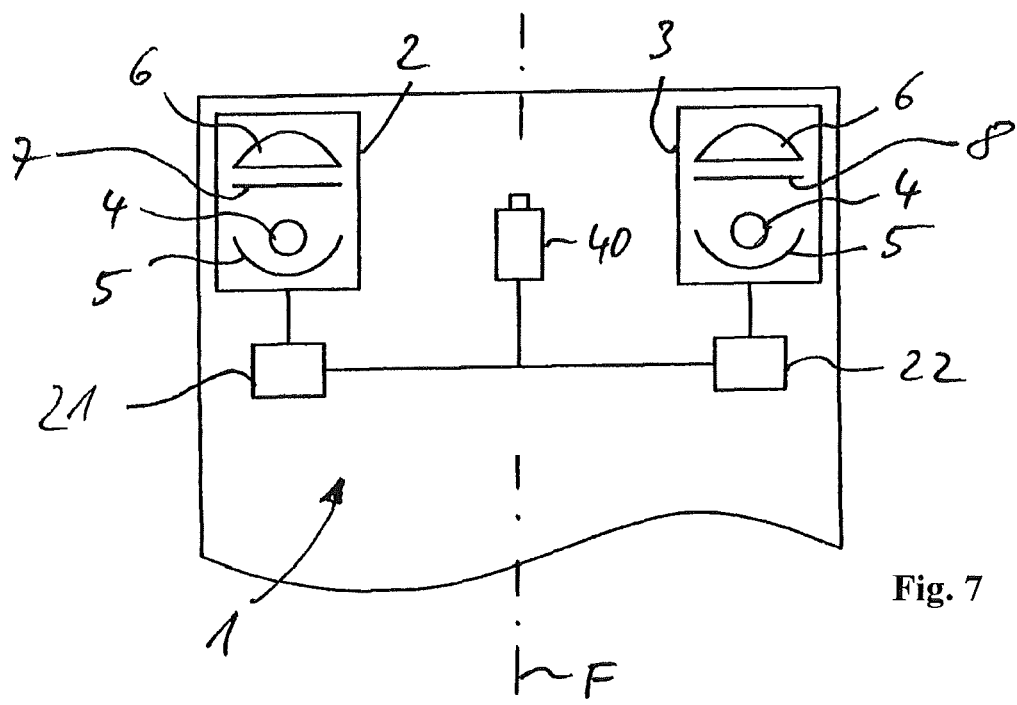
FIG. 7 shows a schematic top view on a vehicle with a projection headlight arrangement consisting of a right projection headlight and a left projection headlight.

As can be seen from FIG. 7, the left projection headlight 2 and the right projection headlight 3 each exhibit a saucer-type reflector 5, at whose first focal point a light source 4 is arranged. A lens 6 is arranged in the proximity of a second focal point of the reflector 5. The left projection headlight 2 and the right projection headlight 3 exhibit the same diaphragm shafts 7, 8, each of which is pivotably arranged around a horizontal rotary axis D. The rotary axis D runs horizontally and perpendicular to an optical axis of the reflectors 5. For adjustment of the diaphragm shafts 7, 8 said diaphragm shafts have a control unit 21 or 22 assigned to them, at whose input a sensor signal provided by a sensor unit 40 lies. The sensor unit 40 can for example be constructed as a camera system, which records the entire far-field (front street area) of the vehicle and detects possible vehicles P. The sensor unit 40 is built in such a way that the location and/or the distance of the projection headlights 2, 3 to an oncoming traffic participant (vehicle) and/or a traffic participant (vehicle) in front in the far-field are recorded. The control unit 21 can comprise a microcontroller or a microprocessor with a memory, in which a light control program is integrated.

Figure 1:
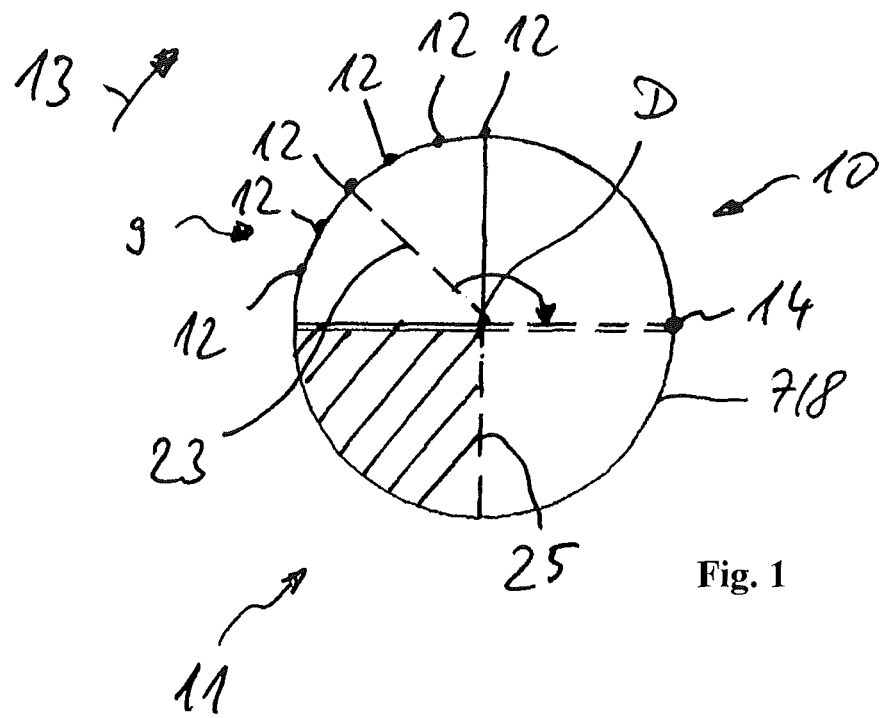
FIG. 1 shows a schematic cross-section through a diaphragm shaft according to a first embodiment of the invention.
Figure 2:
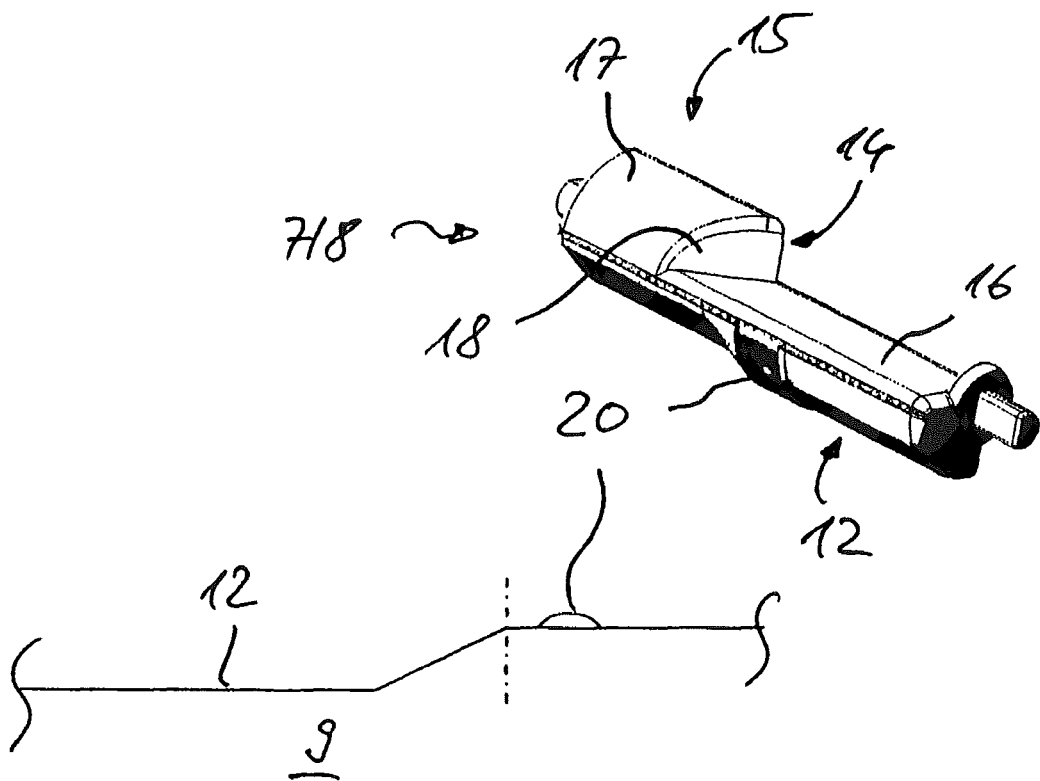
FIG. 2 shows a perspective representation of the diaphragm shaft.

According to a first embodiment of the invention in accordance with FIG. 1 the diaphragm shaft 7, 8 exhibits a first light function sector 9, a second light function sector 10 as well as a third light function sector 11.

Figures 5A, 5B:
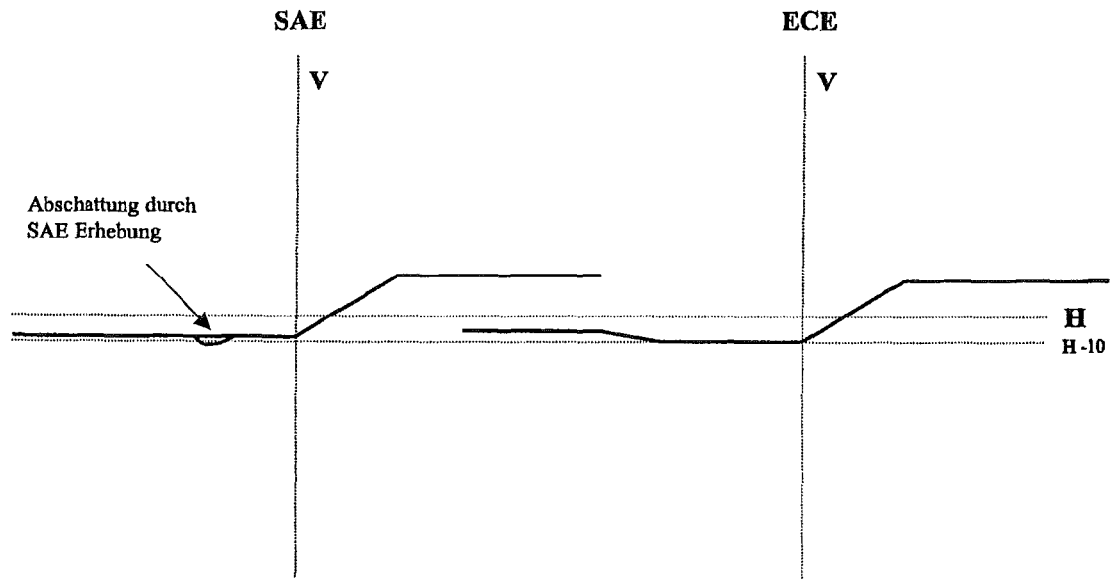
FIG. 5a shows a passing light distribution in accordance with the SAE norm.
FIG. 5b shows a passing light distribution in accordance with the ECE norm.

The first light function sector 9 is constructed as an adaptive passing light function sector, said light function sector extending in a right angle around the rotary axis D of the diaphragm shaft 7, 8 and which exhibits on the jacket surface of said light function sector a plurality of diaphragm edges 12, whose contour has different light distributions assigned with a static recess region. The jacket surface of the diaphragm shaft 7, 8 in the first light function sector 9 thus exhibits a plurality of diaphragm edges 12, wherein adjacent diaphragm edges 12 are arranged offset to each other at a relatively small angle, for example 5 to 10°. Preferably the diaphragm edges 12 of the first light function sector 9 are equally distributed over the jacket surface of the first light function sector 9 in circumferential direction. A first diaphragm edge 12 can be contoured in such a way that a light-dark boundary for the production of an asymmetrical passing light distribution for right-handed traffic in accordance with the ECE norm is produced, see FIG. 5b. A second diaphragm edge 12 can be contoured in such a way that a light-dark boundary for a town light distribution is produced. A third diaphragm edge 12 can be contoured in such a way that a light-dark boundary for a country road light distribution is produced. A fourth diaphragm edge 12 can be contoured in such a way that a light-dark boundary for a freeway light distribution is produced. A fifth diaphragm edge 12 can be contoured in such a way that a light-dark boundary for passing light distribution for left-handed traffic is produced. Additionally, between one or more of the aforementioned diaphragm edges 12 further diaphragm edges 12 can be provided, which serve the purpose of an overpass light distribution. As a result of this a continuous transition is created between the different light distributions of the adaptive light function sector 9. In addition the first light function sector 9 can exhibit a further diaphragm edge 12 for the production of a light-dark boundary for an asymmetrical passing light distribution for the SAE norm. To this purpose the diaphragm shaft 7, 8 exhibits an elevation 20. In a first direction of rotation 13 the second light function sector 10 is arranged adjacent to the first light function sector 9, which is constructed as a high beam light function sector. It extends in an angular region of 180°. The high beam light function sector 10 exhibits a diaphragm edge 14 which is constructed plane and makes possible a comprehensive illumination of the vehicle far-field.

The third light function sector 11 is arranged in the direction of rotation 13 in front of the second light function sector 10 as a high beam light redirection sector which extends in a right angular region between the first light function sector 9 and the second light function sector 10. The high beam light redirection sector 11 exhibits a diaphragm edge 15 which consists of a plane section 16 and a curved section 17 rising from a longitudinal marginal side of the plane section 16 in arc-shaped manner, wherein the front of the curved section 17 joins to the plane section 16. As can be seen from FIG. 3a the diaphragm shafts 7, 8 of the left projection headlight 2 or of the right projection headlight 3 are arranged in mirror-inverted manner to a vertical longitudinal center plane of the vehicle F, wherein the plane section 16 on a side turned toward the longitudinal center plane of the vehicle F and the curved section 17 on a side turned away from the longitudinal center plane of the vehicle F proceed.

The invention makes a relatively fast and dynamic adjustment of the light distributions to the current traffic situation possible, wherein a maximum illumination of the space reserved for traffic is guaranteed. For example, proceeding from a first working position 23 of the diaphragm shaft 7, 8, in which by means of the diaphragm edge 12 an asymmetrical passing light distribution is projected, because by means of the sensor unit 40 an oncoming vehicle is detected, it is possible to move to a second working position 24, in which the diaphragm edge 14 of the second light function sector 10 is active, after it has been recognized that that the oncoming vehicle has passed the projection headlight arrangement 1. The working positions are drawn in dashed lines in FIG. 1. Hence a comprehensive illumination of the vehicle far-field is made possible for the operator after the absence of the redirection of further vehicles in the far-field has been recognized.

If a further vehicle turns into the far-field and the lane of the vehicle, the diaphragm shafts 7, 8 can be distorted into a third working position 25, so that the third light function sector 11 is active. As already described above, the diaphragm shafts 7, 8 in the third light function sector 11 are arranged in mirror-inverted manner relative to a vertical mirror plane S, wherein between the plane section 16 and the curved section 17 of the diaphragm shafts 7, 8 a transition surface 18 is formed. As can be seen from FIG. 3b, a first partial light distribution (left partial light distribution TL) produced by the left projection headlight 2 and a second partial light distribution (right partial light distribution TR—drawn in dashed lines—) formed by the right projection headlight 3 overlap to an overall light distribution G, which exhibits in the center a central light recess region 26. The central light recess region 26 is limited by a first flank 27 of the first partial light distribution TL and a second flank 28 of the second partial light distribution TR. The overall light distribution G corresponds to a conventional high beam light distribution with the difference that a central region, in which the vertical line V extends, is left open from the illumination. As a result of this the blinding of a vehicle P located in front in a central street area can be prevented, otherwise however a comprehensive illumination of the street area can be guaranteed. The first partial light distribution TL and the second partial light distribution TR each exhibit a basic luminous region 29 or 30, wherein adjacent to the basic luminous region 29 of the left partial light distribution TL on a left side a left light finger region 31 and adjacent to the basic luminous region 30 of the right partial light distribution TR on a right side a right light finger region 32 light up a rear street region.

Figure 3A:
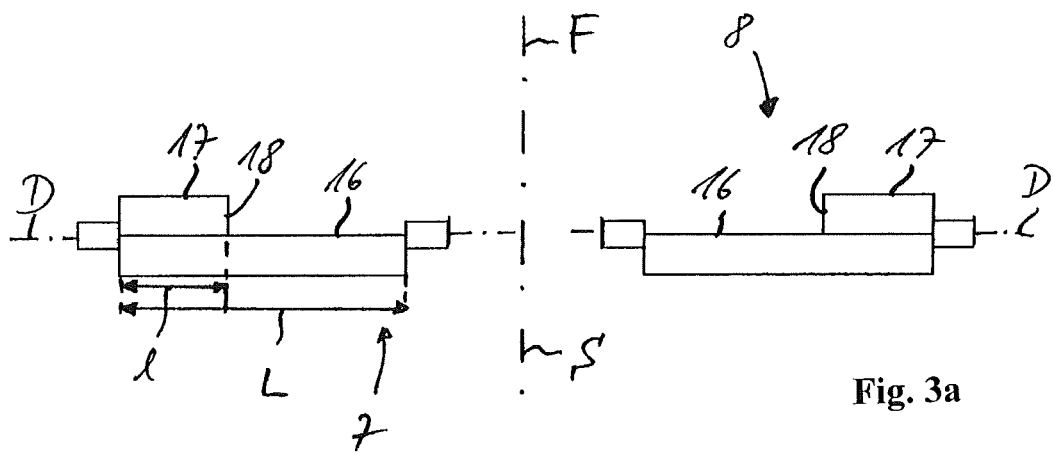
FIG. 3a shows a schematic vertical section through the diaphragm shaft of the left projection headlight and of the right projection headlight when a high beam light redirection sector (third light function sector) of the diaphragm shaft is active.
Figure 3B:
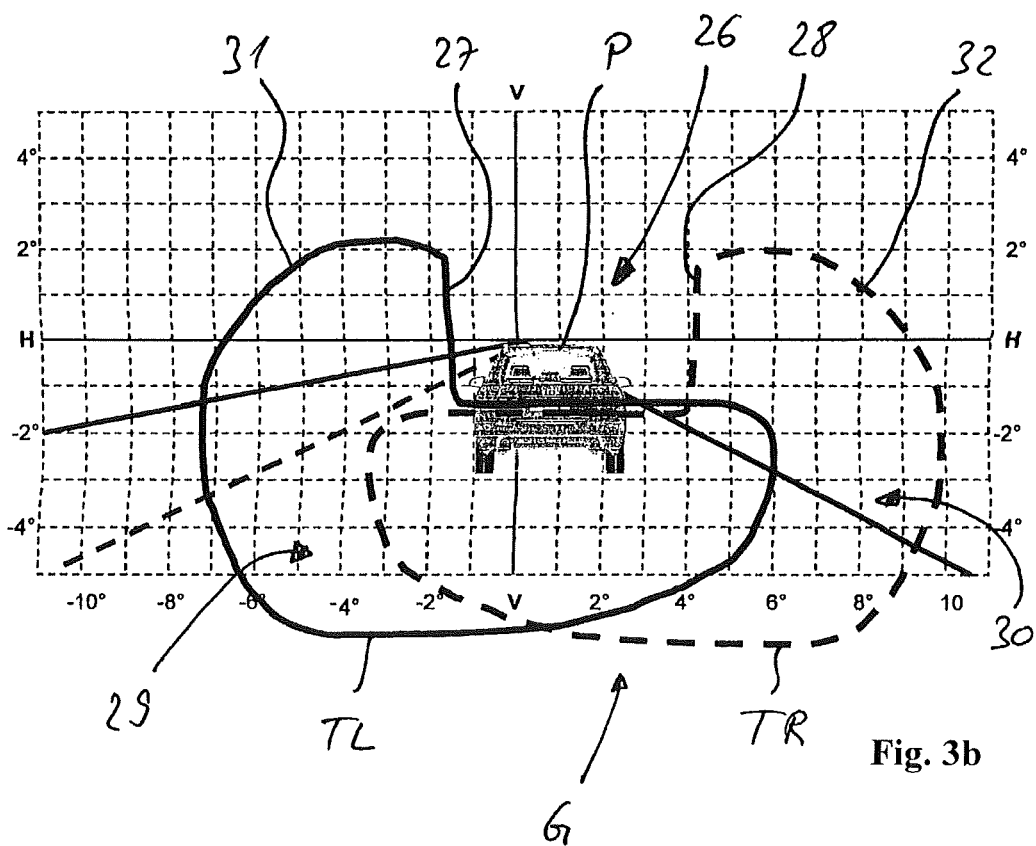

As can be seen from FIG. 3a, the length L of the outer curved section 17 is less than half the length L of the diaphragm shaft 7, 8.

Figure 4A:
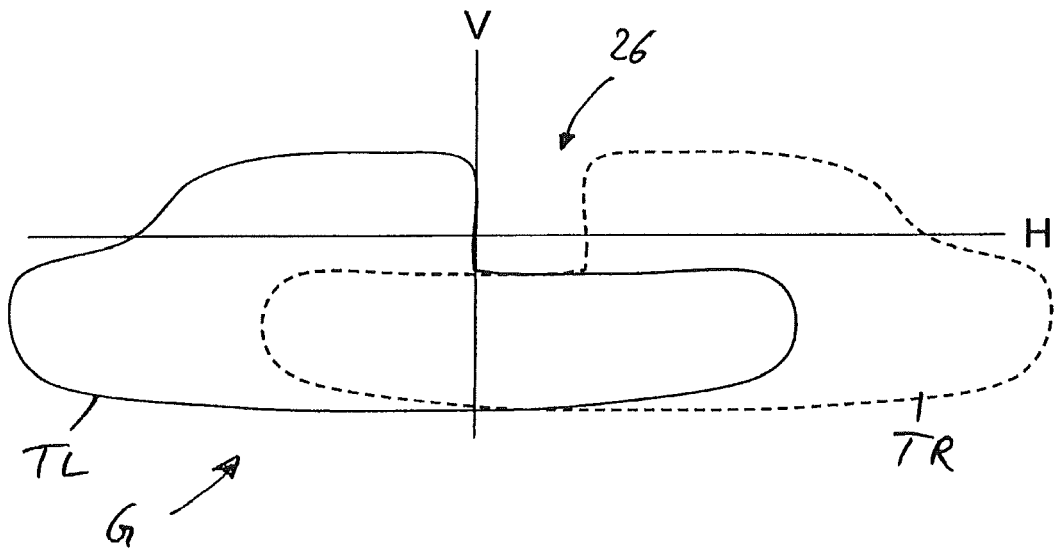
FIG. 4a shows a schematic representation of a non-glare high beam light distribution in which the diaphragm shaft in accordance with FIG. 3a or the projection headlights in the direction of traffic are being moved from a central position to the right.
Figure 4B:
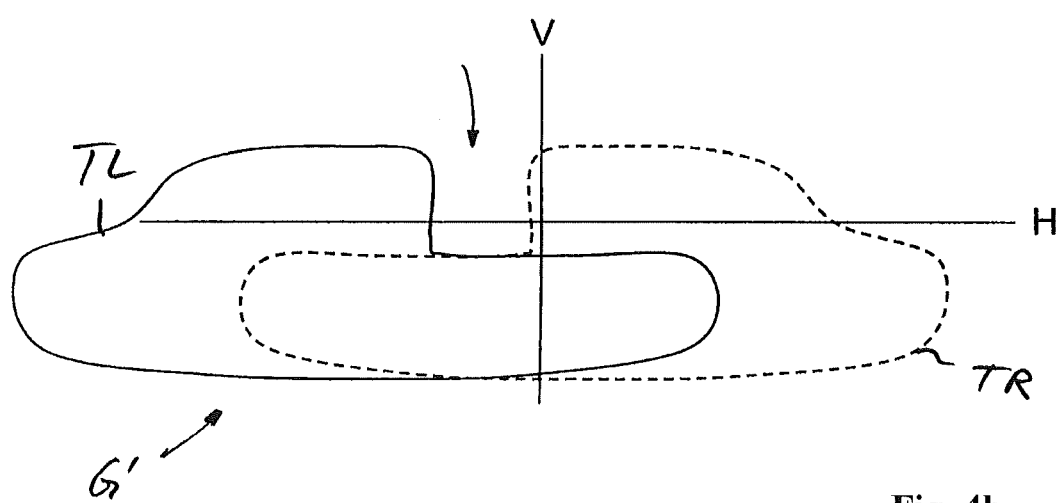
FIG. 4b shows a schematic representation of a non-glare high beam light distribution in which the diaphragm shaft in accordance with FIG. 3a or the projection headlights in the direction of traffic are being moved from a central position to the left.
Figure 4C:
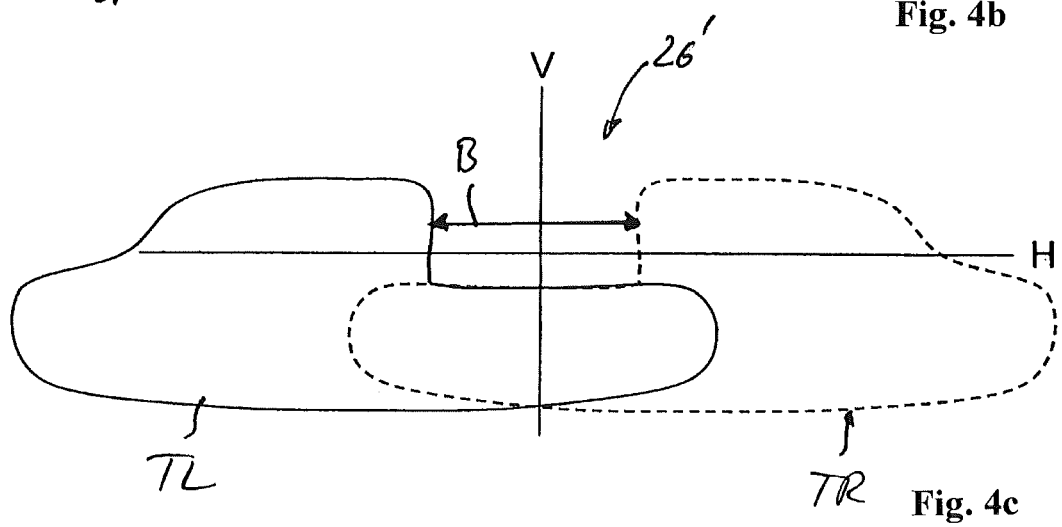
FIG. 4c shows a representation of a non-glare high beam light distribution with a diaphragm shaft in accordance with FIG. 3a, in which the width of the central light recess region has been enlarged outwardly by movement of the diaphragm shaft in longitudinal direction of the same.

In the working position of the diaphragm shaft 7, 8 located in accordance with the third light function sector 11 a dynamic adjustment of the overall light distribution G can take place in dependence on the location of the further traffic participants. As can be seen from FIG. 4a, the overall light distribution G can be directed to the right in the direction of traffic by distortion of the diaphragm shafts 7, 8 around a vertical axis which runs perpendicular to the longitudinal axis of the vehicle, so that the light recess region 26 is arranged to the right of the vertical line V. In the case of a direction of the diaphragm shafts 7, 8 to the left the light recess region 26 drifts to the right, so that an overall light distribution G' is produced in accordance with FIG. 4b. For the formation of a greater width B of the central recess region 26 the diaphragm shafts 7, 8 or the projection headlights 2, 3 are directed outward in the opposite direction to be precise the left projection headlight 2 being directed to the left and the right projection headlight 3 to the right. As a result of this a widened light recess region 26' is created in accordance with FIG. 4c, so that the redirection of wider vehicles driving in front or several vehicles arranged next to each other is made possible.

Figure 6:
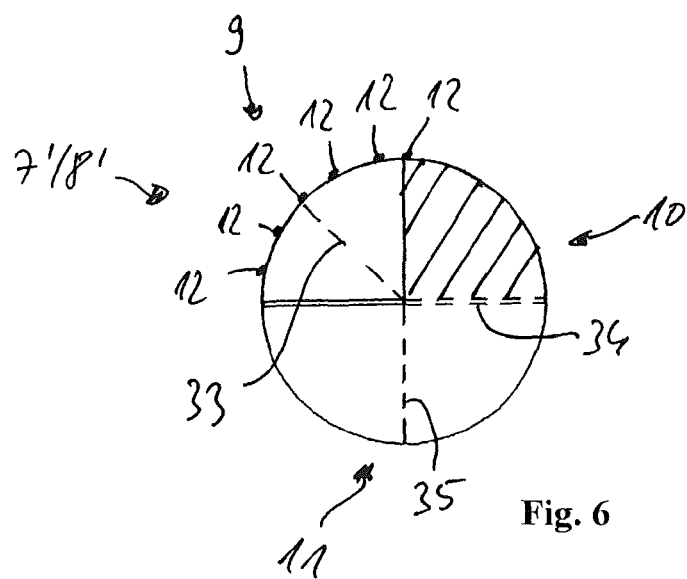
FIG. 6 shows a schematic cross-section through a diaphragm shaft according to a second embodiment of the invention.

According to a second embodiment of a diaphragm shaft 7', 8' in accordance with FIG. 6 the third light function sector 11 can also be arranged in the direction of rotation 13 adjacent to the first light function sector 9. For example if the diaphragm shaft 7', 8' is in a first working position 33—as in the case of the preceding exemplary embodiment—, in the case of the detection of a vehicle driving in front the diaphragm shaft 7', 8' can be adjusted in the direction of rotation 13 relatively quickly from the asymmetrical passing light function to the non-glare high beam light function in accordance with a second working position 34. For example, if the vehicle in front then turns from the lane of the vehicle, it is possible to switch from the non-glare high beam light function (second working position 34) to the third working position 35 (high beam light function in the second light function sector 10). The arrangement of the light function sectors 9, 10, 11, can be varied depending on the desired light function sequence pattern. For example, the diaphragm shaft 7, 8 or 7', 8' can also be operated opposite the direction of rotation 13.

| List of Reference Symbols | |
|---|---|
| 1 | Projection headlight arrangement |
| 2 | Left projection headlight |
| 3 | Right projection headlight |
| 4 | Light source |
| 5 | Reflector |
| 6 | Lens |
| 7, 7' | Diaphragm shaft |
| 8, 8' | Diaphragm shaft |

-continued

| List of Reference Symbols | |
|---|---|
| 9 | First light function sector |
| 10 | Second light function sector |
| 11 | Third light function sector |
| 12 | Diaphragm edges |
| 13 | First rotary axis |
| 14 | Diaphragm edge |
| 32 | Light guide section |
| 33 | First working position |
| 34 | Second working position |
| 35 | Third working position |
| 40 | Sensor unit |
| D | Rotary axis |
| F | Longitudinal center plane of the vehicle |
| B | Width |
| P | Vehicle |
| S | Mirror plane |
| G, G' | Overall light distribution |
| | Left partial light distribution |
| | Right partial light distribution |
| L | Length |

Diaphragm edge
Plane section
Curved section
Transition surface
Elevation
Control unit
Control unit
First working position
Second working position
Light transition region
First flank
Second flank
Basic luminous region
Basic luminous region
Light guide section

The invention claimed is:

1. A projection headlight arrangement for vehicles with a left projection headlight and a right projection headlight, each comprising:
   a reflector exhibiting two focal points,
   a light source arranged in a first focal point of the reflector,
   a lens upstream of the reflector in the direction of light emission and
   a diaphragm shaft arranged between the lens and the reflector, which is displaceable in several rotary positions around a horizontal rotary axis running transverse to the optical axis, wherein the rotary positions each have a diaphragm edge of the diaphragm shaft assigned for the creation of a light-dark boundary for a specified light distribution,
   a sensor unit is provided for the detection of a traffic participant located in the far-field of the vehicle,
   a control unit said control unit moving the diaphragm shaft in dependence on a sensor signal of the sensor unit that such a diaphragm edge of the diaphragm shaft provides a complete illumination of a far-field;
   the diaphragm edges are assigned to light function sectors of the diaphragm shaft, said light function sectors sweeping a variable angular region in the direction of rotation of the diaphragm shaft;
   a first light function sector is constructed as an adaptive passing light function sector which extends over an acute or right angle around the rotary axis of the diaphragm shaft and which exhibits a plurality of diaphragm edges, each of said diaphragm edges producing a passing light distribution, each of said passing light distributions being one of a town light distribution or a country road light distribution or a freeway light distribution or an overpass light distribution or a passing light distribution for right-handed traffic or a passing light distribution for left-handed traffic.

2. The projection headlight arrangement according to claim 1, wherein a second light function sector is constructed as a high beam light function sector, which extends over an angular region of 180°, which is arranged adjacent to the first light function sector and which is equipped with a diaphragm edge for the production of a high beam light distribution.

3. The projection headlight arrangement according to claim 1, wherein a third light function sector is constructed as a high beam light redirection sector which extends in an obtuse or right angular region which is arranged adjacent to the first light function sector and the second light function sector and which exhibits a diaphragm edge for the production of a non-glare high beam light distribution.

4. The projection headlight arrangement according to claim 3, wherein at least one diaphragm edge of the third light function sector includes a diaphragm edge of the left projection headlight having a first partial light distribution and a diaphragm edge of the right projection headlight having a second partial light distribution said first and second partial light distributions when projected, overlapping to provide an overall light distribution wherein the overall light distribution exhibits a light recess region which is limited by two laterally opposing flanks, wherein the first flank is formed by the first partial light distribution and the second flank is formed by the second partial light distribution.

5. The projection headlight arrangement according to claim 1, wherein the diaphragm edges of the left projection headlight and the right projection headlight in a third light function sector provide a mirror-inverted arrangement relative to a vertical longitudinal center plane of the vehicle running between the left projection headlight and the right projection headlight.

6. The projection headlight arrangement according to claim 1, wherein the diaphragm shaft, wherein the diaphragm edge of a third light function sector is active, can be pivoted around a vertical axis in dependence on the current position of another vehicle in the far-field such that the other vehicle in the far-field is always located in the light recess region of the overall light distribution.

7. The projection headlight arrangement according to claim 1, wherein the first light function sector exhibits at least one diaphragm edge with an elevation for the formation of a light-dark boundary so that an asymmetrical passing light distribution is produced.

8. The projection headlight arrangement according to claim 1, wherein the diaphragm edge is formed from a plane section and a curved section adjoining to a front, wherein the curved section extends in the direction of rotation in an arc-shaped manner from a longitudinal border of the plane section.

9. The projection headlight arrangement according to claim 1, wherein a transition surface is formed between a plane section and a curved section of the diaphragm edge, said transition surface running perpendicular to the rotary axis of the diaphragm shaft.

10. The projection head light arrangement according to claim 1 wherein said complete illumination of the far field is provided without blinding the traffic participant detected in the far-field of the vehicle.

11. The projection head light arrangement according to claim 6 wherein said pivoting is in one of a synchronous or a time displaced manner.

12. The projection head light arrangement according to claim 7 wherein said asymmetrical passing light distribution is according to an SAE standard.

\* \* \* \* \*